Dec. 25, 1923.
L. ALLEN
MOVABLE HEADLIGHT
Filed Aug. 9, 1922
1,478,369
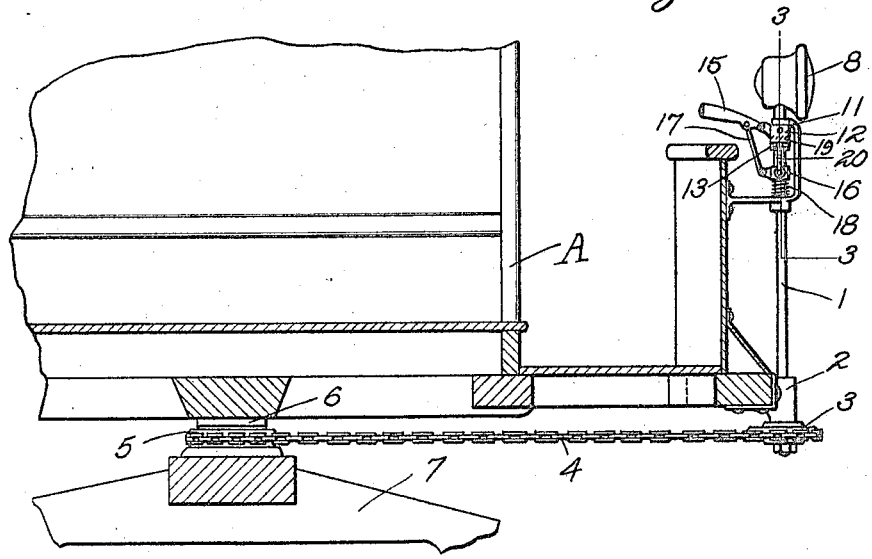
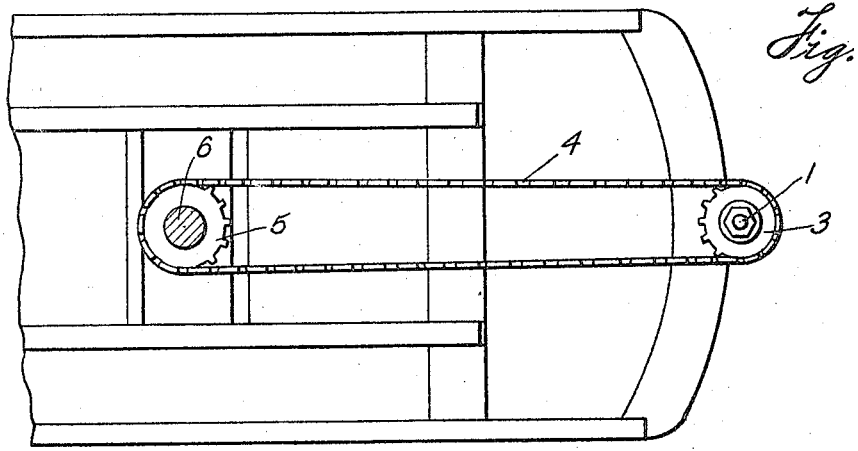
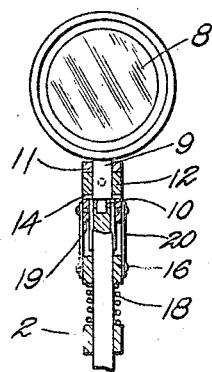
Luke Allen
INVENTOR Patented Dec. 25, 1923.

1,478,369

UNITED STATES PATENT OFFICE.

LUKE ALLEN, OF LITTLE ROCK, SOUTH CAROLINA.

MOVABLE HEADLIGHT.

Application filed August 9, 1922. Serial No. 580,735.

*To all whom it may concern:*

Be it known that I, LUKE ALLEN, a citizen of the United States, residing at Little Rock, in the county of Dillon and State of South Carolina, have invented new and useful Improvements in Movable Headlights, of which the following is a specification.

This invention relates to headlamps for motor cars and the like, the general object of the invention being to provide means whereby the lamp can be turned to follow the road or track with its rays by connecting it with a part of the steering mechanism or a part of the front truck of the vehicle so that the lamp will be turned with the front wheels of the vehicle.

Another object of the invention is to provide means whereby the lamp can be turned by hand while disconnected from the turning mechanism.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a longitudinal sectional view through a part of a car showing my invention in use.

Figure 2 is a horizontal sectional view through Figure 1.

Figure 3 is a section on line 3—3 of Figure 1.

In these views, 1 indicates a shaft which is journaled in the brackets 2, placed on the front of the car A. The lower end of this shaft carries a sprocket 3 which is engaged by an endless chain 4, which also engages the sprocket 5 on the king bolt 6 which connects the truck 7 with the car body. Thus when the truck turns on a curve the movement thereof will be communicated to the shaft.

The lamp 8 has its shank 9 provided with a reduced end which engages the socket 10 formed in the upper end of the shaft and the shank is also supported by an extension 11 of the top bracket 2. A collar 12 is secured to the shank, this collar being provided with teeth 14 which are formed on its lower end. A handle 15 is pivoted to this collar and said handle is connected to a collar 16 by the link 17. The collar 16 is loosely mounted on the shaft and is pressed upwardly by a spring 18 on the shaft and which is located between the bracket 2 and the said collar. A clutch collar 19 is keyed to the shaft and is connected with the collar 16 by the links 20 which carry pins for engaging an annular groove 13 in the collar 19 so that the collar 16 and the links can have rotary movement about the shaft without interference on the part of the collar 19. The clutch collar 19 is normally pressed into engagement with the toothed lower end of the collar 12 by the spring 18 pressing the collar 16 upwardly. Thus when the parts are in normal position the lamp will be moved with the shaft through the clutch means described, but when the handle is pressed downwardly the clutch parts will be separated so that the lamp will be free of the shaft and will not be rotated thereby but said lamp may be moved by means of the handle. As will be understood, the lamp is not rotated in a complete circle but only back and forth to swing its rays in an arc in front of the car.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim is:—

In a motor vehicle, upper and lower brackets at the front thereof, a shaft rotatably mounted in said brackets, means for connecting the lower end of the shaft with a part of the turning means of the vehicle, a lamp, a shank connected therewith and rotatably engaging the upper end of the shaft, an extension on the upper bracket forming a bearing for the shank, a clutch part connected with the shank, a clutch part connected with the shaft and having an annular groove therein, a collar rotatably mounted on the shaft, a handle connected with the clutch part on the shank, a brace connecting the handle with the collar, links connecting the collar with the clutch collar, pins in the links engaging the groove in the clutch collar and a spring engaging the rotary collar for normally holding the clutch parts in engagement with each other.

In testimony whereof I affix my signature.

LUKE ALLEN.